United States Patent
Laurinavichus

(10) Patent No.: US 7,149,303 B1
(45) Date of Patent: Dec. 12, 2006

(54) SYSTEM AND METHOD FOR OPTIMIZED DISTRIBUTION OF CALLS TO CALL CENTER RESOURCES

(75) Inventor: Vladislav I. Laurinavichus, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 162 days.

(21) Appl. No.: 10/951,691

(22) Filed: Sep. 29, 2004

(51) Int. Cl.
*H04M 3/00* (2006.01)

(52) U.S. Cl. .............................. 379/265.01; 379/67.1

(58) Field of Classification Search .................. None
See application file for complete search history.

(56) References Cited

U.S. PATENT DOCUMENTS

| | | | | |
|---|---|---|---|---|
| 6,553,113 B1 * | 4/2003 | Dhir et al. | ............. | 379/265.02 |
| 6,959,073 B1 * | 10/2005 | Reynolds | ............. | 379/88.16 |
| 2005/0069102 A1 * | 3/2005 | Chang | ............. | 379/88.18 |

* cited by examiner

Primary Examiner—Creighton Smith

(57) ABSTRACT

A system and related techniques receive incoming (800) telephone calls, such as customer service calls or others, and intelligently distribute those calls to reduce wait time and increase overall service levels. According to the inventive platform in one regard, all calls made to a call center site may be immediately transferred to an interactive voice response (IVR) farm or other automated call resource. According to the invention in one regard, the inbound call flow may be distributed to IVR units in that set of resources based on load balancing or other network criteria. The IVR farm or other automated resource may present the callers with an interactive voice menu or other dialogue, in which the user may select account, activation or other information directly. Some percentage of caller transactions may be satisfied at that automated stage, all of which may take place within the call center operator's network or facility. Some percentage of the caller transactions may require transfer to remote facilities including automatic call distributors (ACDs), for instance configured to distribute calls to a set of customer service representatives. The determination of the destination ACDs may be based in one regard on call and caller information trapped at the initial call intake and IVR stages. Because a comparatively small number of calls are forced to be diverted to remote ACD resources, and because accurate assignment of those calls may be enhanced with fewer calls requiring re-diversion, the overall service levels of the facility including caller wait time and number of satisfied calls may be increased.

34 Claims, 4 Drawing Sheets

SYSTEM AND METHOD FOR OPTIMIZED DISTRIBUTION OF CALLS TO CALL CENTER RESOURCES

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to the field of telecommunications, and more particularly to a platform for accepting and distributing inbound customer service or other calls to interactive voice response units, while further diverting individual calls as necessary to remote automatic call distributor sites or other resources when those calls are not satisfied by the initial automated response.

BACKGROUND OF THE INVENTION

The demand for ever-improved customer support and the responsiveness expected in the telecommunications, financial and other industries have led to a steady quest for enhanced call center efficiency. Large service organizations such as banks, credit card companies, cellular telephone or other telecommunications providers and other industries with large or growing customer bases demand prompt response time on customer service calls. A common goal of these types of support operations is to reduce customer hold time, improve network and human resources utilization and other service level metrics indicating the speed and efficiency with which customer inquiries are processed. Those inquiries may at times exceed a hundred calls per second or more in large organizations, so that efficiency gains in those and other settings can readily translate to meaningful gains in support costs and customer satisfaction.

In a typical call center network such as that illustrated in FIG. 1, a caller may call into a service center via a long distance or cellular voice network, for instance using a toll-free (e.g. 800) or local number. A routing engine or other network logic may direct the inbound call to one of a set of remote automatic call distributors (ACDs), any one or more of which may be located at separate physical sites. The inbound call may be discriminated to be distributed to a particular ACD based on a variety of call data. That call data may generally include objective information about the call event such as dialed number (DN), caller number such as the caller's number reported by automatic number identification (ANI) or other services, time of day or other information. Furthermore, additional caller data associated with the specific caller placing the call, such as a subscriber or customer account number, may also be captured at the initial stages to help in determining where to send, or how to process, the call. For example caller data may include caller-entered data (CED) such as digits entered on a telephone touchpad in response to voice prompts. Thus a given call may be discriminated by call data such as dialed number or caller number, as well as by caller data, or combinations of the two.

Business rules or other decision logic may then be applied to that data to determine, for instance, that a caller calling in on an identified (800) line who has keyed in a valid subscriber number needs to be transferred to a service customer service representative (CSR) for retention, billing, warranty or other assistance, or to other destinations. Typically, deployment of the call to a CSR pool having a particular skill or tool set or other destination will involve transfer to a local ACD which is trunked to a set of CSR workstations and other corresponding resources.

Once the call has been transferred to a particular local ACD, the call may be serviced, for example, by connecting the call to a live customer service representative, by diverting the call to an appropriate interactive voice response (IVR) unit to query the caller for further data, or by sending the call to other local or remote resources. However, there are recurring difficulties in efficiently moving the call to the most appropriate local ACD and related resources or tools, and thus successfully completing the call.

For one, the call information including call data and caller data which are captured at the front end of the call progression are often not complete or determinative, in themselves. In certain call center environments no more than 25% of the necessary information to accurately distribute a call may be captured at the front end, due to limitations such as lack of time to capture that data, limited data compatibility between various network nodes, or for other reasons.

Therefore, while rules-based logic may attempt to place a call to the ACD or other local resource most suited to servicing that call, in a significant number of cases the call may still be transmitted to a destination which is not capable of satisfying the customer inquiry. In that case, the call must be moved back out of the local ACD and transferred to another remote ACD or other resource. This redirection increases the call pendency since the call must go back into another queue, which may in turn increase the possibility of dropped or customer-terminated calls. Rerouting may also increase the expense for operators who must use toll lines or other metered connections to reach the next ACD site. Moreover, even when a call has been transferred to another ACD or other site, there is no guarantee that the call will be satisfied at that destination. Additional transfers may be necessary. Other problems in call center routing and distribution technology exist.

SUMMARY OF THE INVENTION

The invention overcoming these and other problems in the art relates in one regard to a system and method for optimized distribution of service and other calls to call center resources, in which a routing engine or other decision logic monitors and manages incoming calls to immediately distribute those calls to a set of front end interactive voice response farms. In embodiments, the distribution of the inbound calls to specific farms or IVR units within those farms may be performed based on the instantaneous load reported on IVR units in the set or farm. Thus the inbound call flow may in one regard be first disseminated based on immediate network conditions to an automated resource. According to embodiments of the invention in a further regard, some portion of the calls diverted to the IVR or other automated call resources may be satisfied via customer interaction with that automated system, for instance to read out account balances, check activation or subscription status, or to retrieve other information. According to embodiments of the invention in another regard, only after a caller has remained on the line and progressed beyond initial IVR interaction is the call further analyzed by a routing engine to determine a remote destination to direct the call to, such as an automatic call distributor or other remote destination. In one regard some portion of inbound calls may be satisfied in the IVR farm or similar resources, and so the number of calls which require transfer to comparatively more resource-intensive ACD sites may be reduced. Moreover, because the initial automated IVR stage can also help discriminate call type and retrieve call data and caller data, the delivery to ACD sites may be more accurate, because the routing engine may incorporate that data into its decisioning process before distributing the call to remote sites. Therefore the service levels achieved by the call center or other facility may be increased, including to reduce wait time and increase the percentage of completed or satisfied call transactions.

DETAILED DESCRIPTION OF EMBODIMENTS

Figure 1:
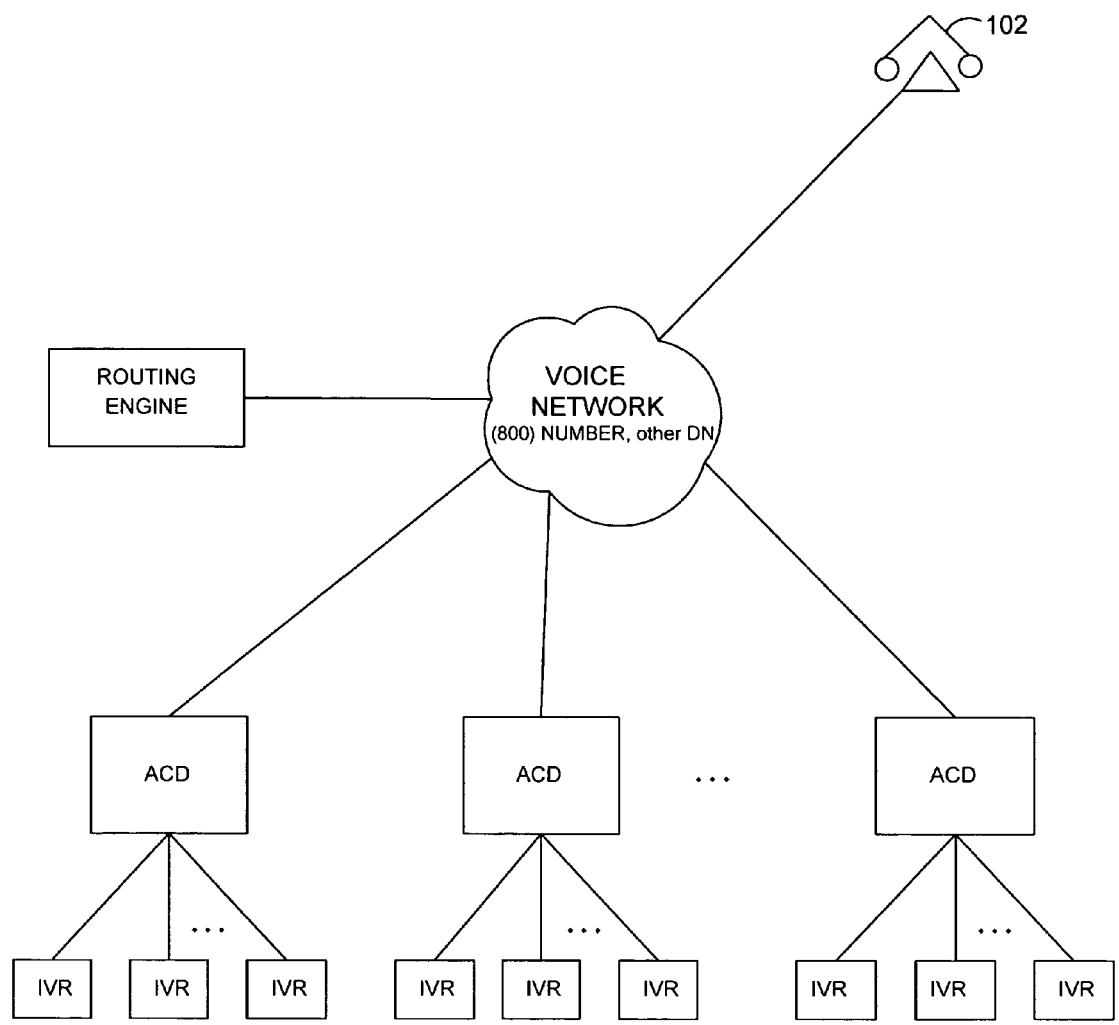
FIG. 1 illustrates a call center network, according to known architectures.
Figure 2:
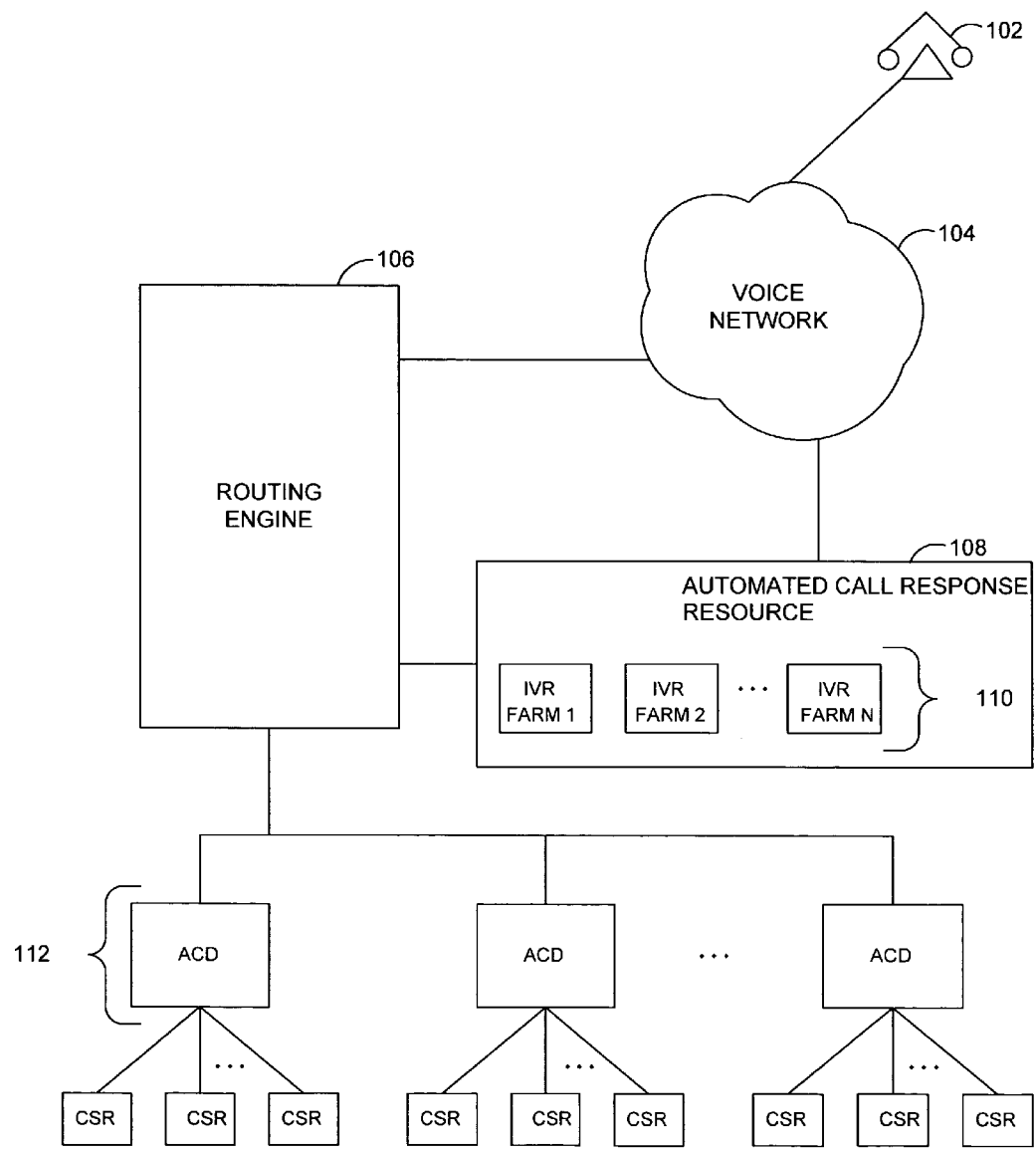
FIG. 2 illustrates a call center network, according to embodiments of the invention.

FIG. 2 illustrates an environment in which a system and method for optimized distribution of calls to call center resources may operate, according to embodiments of the invention. As illustrated in that figure, a caller 102 may initiate a call via a voice network 104. The caller 102 may initiate that call in a variety of ways, for instance by initiating a cellular call or other wireless call to a customer support number, or by dialing an (800) number via a landline connection through the public switched telephone network (PSTN) or other link. The call may likewise be initiated via a voice over Internet Protocol (VoIP) call or connection, or establishing a voice call or hybrid voice/data call via other wired or wireless channels, links or connections. The call may in embodiments be or include a direct-dialed, transferred, multi-party conference or other call or connection.

Once the call is initiated, according to embodiments of the invention in one regard the incoming call may be communicated to a routing engine 106, which may for example be or include a server or other resource. The routing engine 106 may for instance be incorporated in an Advanced Intelligent Network (AIN) configuration or network, a Signaling System 7 (SS7) network or other communications network or fabric, and may in embodiments include or interface to intelligent call management (ICM) hardware, software or other resources.

According to embodiments of the invention, the routing engine 106 may host rules-based logic and other control to be applied to the incoming call, to analyze, route and manage the call during its duration. According to embodiments of the invention in one regard, the routing engine 106 may route the call directly to an automated call response resource 108, before additional call processing takes place. That is, according to embodiments of the invention in one regard, the call may be transmitted to the automated call response resource 108 before further call discrimination and selective routing to remote resources, such as ACDs or others, takes place. As illustrated in FIG. 2, the automated call response resource 108 itself may be, include or interface to, for example, a set of interactive voice response farms 110. That collection may include one or more interactive voice response farms each containing one or more interactive voice response units, for instance units presenting voice menus to prompt for keypad touch-tone, to capture voice responses for voice recognition processing, to receive telephone typewriter (TTY) data, or to capture or process other input or data from, via or related to caller 102 and their inquiry.

According to embodiments of the invention in one regard, the call may be distributed to one of the set of interactive voice response farms 110 based on load balancing criteria. Thus routing engine 106 may transfer the call to an available IVR farm which, for example, has the greatest processor idle time, available bandwidth or the largest number of open or momentarily unused ports. Other load balancing or other criteria may be used. It may be noted that according to embodiments of the invention in another regard, the automated call response resource 108 may periodically report utilization rates and other data to the routing engine 106, to permit load balancing assignments to take place on a current basis. That updating may occur at comparatively short intervals of minutes or seconds, or more or less time according to implementation. That updating may be facilitated in embodiments where one provider owns or operates network connections between the routing engine 106 and automated call response resource 108, including to reduce cost and contention in that updating channel. However, because in all cases the incoming call is directly transmitted to the set of interactive voice response farms 110 within automated call response resource 108 based on fast decisioning criteria, the call may arrive at a voice response unit within an interactive voice response farm in a comparatively short time, which in cases may be on the order of 250 milliseconds, or more or less.

The caller 102 may thus be connected to an interactive voice response menu or other prompt or sequence in real-time or near-real-time after initiating the call and reaching the voice network 104. The caller 102 may thus be engaged by the interactive voice response processing algorithms of the set of interactive voice response farms 110. The caller 102 may be presented, for example, with a voice menu prompting them to enter keypad or touch-tone data, voice response data, TTY data or other responses or data to capture details of their inquiry or other request. For example, the caller 102 may be prompted to speak or enter a telephone account number, a credit card account number, or other account, subscription or other number or identifier. The caller 102 may for example select a sequence of selections, prompts, notices, alerts and other messages and responses while connected to the automated call response resource 108. In embodiments that connection and associated responses and data capture may generally take place for a few seconds to a few minutes or more or less, depending on the nature of the caller's inquiry, resulting menu trees and other factors.

The data captured up to the point that the initial interactive voice response interaction is complete may in embodiments be encapsulated in call information 114, an object which may then be transmitted to the routing engine 106. Call information 114 may in one regard contain, for example, both call data and caller data as well as other information. Call data may be or include data such as the dialed number identified via dialed number identification service (DNIS), calling number data such as a ten-digit or other telephone number generated via automatic number identification service (ANI) or other services, time of day or date of call origination, the carrier over which the call arrives or which bills or services the call, or other call parameters related to or identifying the originating call. Caller data may contain, for instance, caller entered data such as touch-tone, keypad, voice response or other inputs, for instance in response to a voice prompt, TTY or other menu or interface, such as for example account, subscriber, user name, social security or other identifiers or data. Caller data may likewise in embodiments include data retrieved from past transactions or exchanges, for instance automatically retrieved or identified via the caller's calling number, whether identified automatically or entered by the caller. Other types, categories and formats of data are possible.

The routing engine 106 may receive the call information 114, and based on that data evaluate or determine a call type or call category for the in-process call. That is, the routing engine 106 may host and execute rules-based logic or other decisioning algorithms which identify, for example, a customer calling from their home telephone number who has correctly entered a product serial number for a product purchased less than 12 months ago may have a probable warranty or repair service call or inquiry. Other call types or categories may include, for example, cellular or other telephone or telecommunications account inquiries, for instance for billing, subscription, service, cancellation, or other purposes. Other types of calls such as financial inquiries or transactions including telephone banking inquiries or brokerage trades, mail order transactions, hotel, airline or other travel or other reservations, rebate or refund processing, locator services or other call categories, inquiries or types are possible.

Based on the call information 114, the routing engine 106 may distribute any still-pending, incomplete or unsatisfied calls or inquiries to one of a further set of automatic call distributors 112. The set of automatic call distributors 112 may be or include local or remote call distribution trunks or exchanges, which for instance in embodiments may be located off-premises, which in cases may be on a related or on a separate network from the resources of the owner or operator of the automated call response resource 108. In embodiments, any one or more of the automatic call distributors within the set of automatic call distributors 112 may be dedicated or linked to specific customer support tasks or other resources. For example, one automatic call distributor may be dedicated to subscription or retention support, and connect with resources tailored to those functions.

Those resources may include, for example, a group of customer service representatives (CSRs) who may be experienced in account subscriptions, and who may be supplied with application tools, such as databases or data mining tools, to resolve subscription, billing, service or other issues. Each of the automatic call distributors may likewise connect to or communicate with a set of quality assurance or other automated voice recording resources as appropriate, to generate further queries, inputs or data access, including by way of caller voice recording. Those IVR or other resources may for example be configured with menus or other interfaces to prompt the user for account subscription or other transactional information. Because the routing engine 106 may in one regard assimilate a comparatively expanded degree of call, caller and related information before routing calls to specific units having specific customer support functions within the set of automatic call distributors 112, the accuracy or appropriateness of overall call distribution may be enhanced. That is, the likelihood that caller 102 may be connected to or presented with information satisfying their inquiry may be greater compared to, for example, known platforms in which calls are routed to remote automatic call distributors before comparable information is known.

Figure 3:
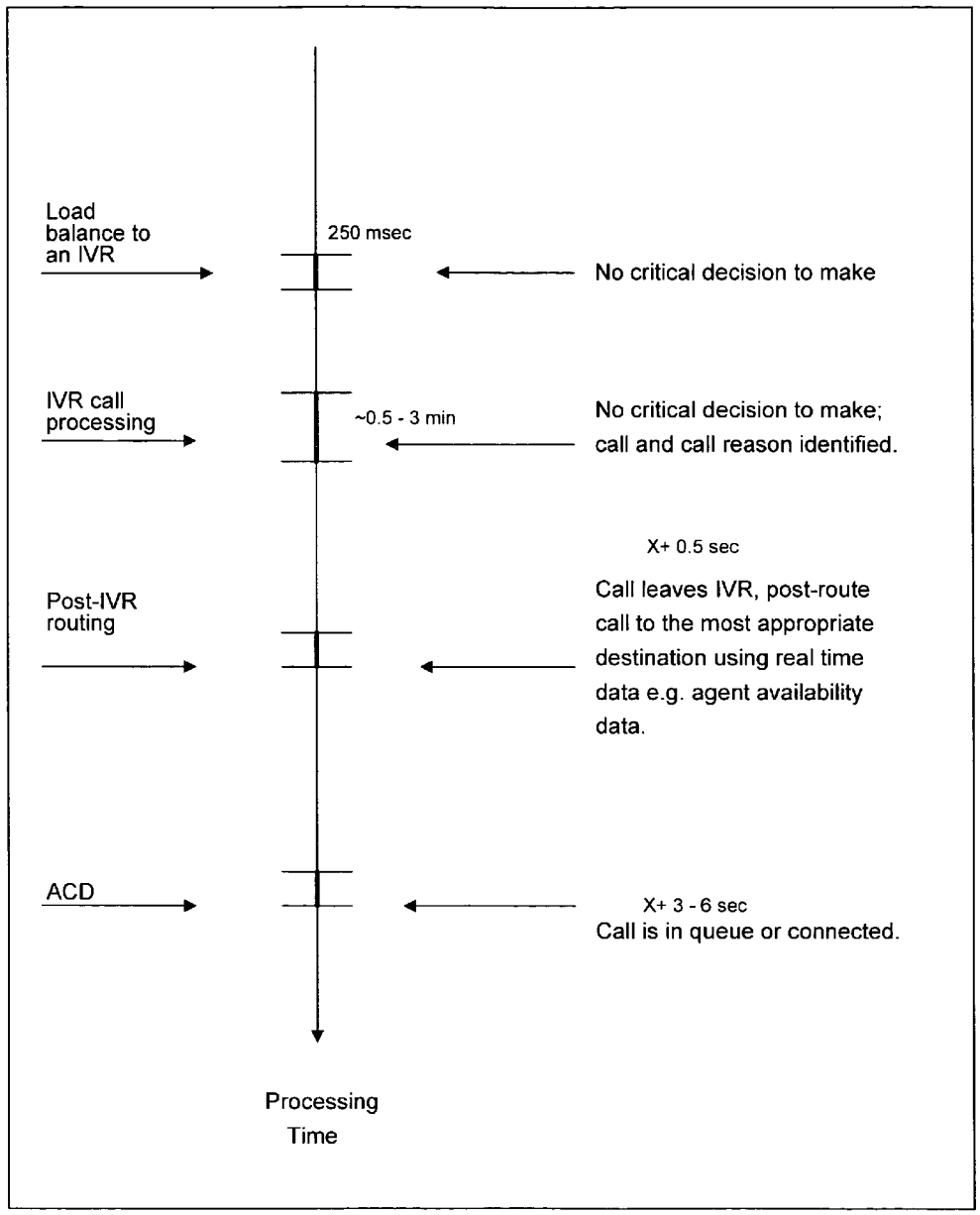
FIG. 3 illustrates a sequence of call intake processing including latency timings, according to embodiments of the invention.

Moreover, and as illustrated in FIG. 3, call distribution efficiency according to embodiments of the invention may also be increased. That is, the total elapsed time during various stages of processing according to the invention may be economized, since the initial call routing to the automated call response resource 108 based on load balancing or other network factors may take place in real-time or near-real-time, as noted on the order of 250 milliseconds, or more or less.

The caller 102 may then enter interactive voice response processing in the set of interactive voice response farms 110, during which the dwell time may as illustrated be on the order of 30 seconds to 3 minutes, or more or less. During that period of processing the caller 102 is however still engaged in interactive prompts, and less likely to experience an impression of unnecessary wait time and delay.

Following the completion of the interactive voice response or similar session, the routing engine 106 may be able to make a determination of an appropriate destination, for example to a unit or site within the set of automatic call distributors 112, within another comparatively short, real-time or near-real-time period, which as illustrated may be on the order of ½ second, or more or less. Upon intake in the set of automatic call distributors 112, the caller 102 may experience a wait time of, illustratively, 3–6 seconds or more or less while the call is sent to an appropriate CSR, IVR or other matched resource. At this stage, further processing may be performed to calculate, for example, CSR workload, for example by measuring the number of calls in queue or other metrics to distribute the call to an appropriately assigned representative. CSR skill or toolsets may also be considered. Other processing or ordering may be performed on calls for distribution to the set of automatic call distributors 112.

Thus, according to the invention in one regard, from call intake to call completion the caller 102 may overall be expected to generally experience a significantly reduced or nominal amount of wait time during the processing of their call, compared to known support platforms. This is again in part possible among other things because of the immediate or near-immediate connection of calls upon to the automated call response resource 108, as well as the front-end capture of call information 114 permitting accurate evaluations of call type and routing by routing engine 106, before redirecting calls to matched CSR or other resources.

It may be noted that is cases, calls transferred to a given automatic call distributor or other resource in the set of automatic call distributors 112 may yet on occasion reach a CSR or other resource not capable of satisfying the inquiry. In such cases, the call may be placed back into queue for further processing, for example, to be transmitted to routing engine 106 to redirect the call to another automatic call distributor or resources, for instance based on any updated call information 114 gained, or otherwise.

Figure 4:
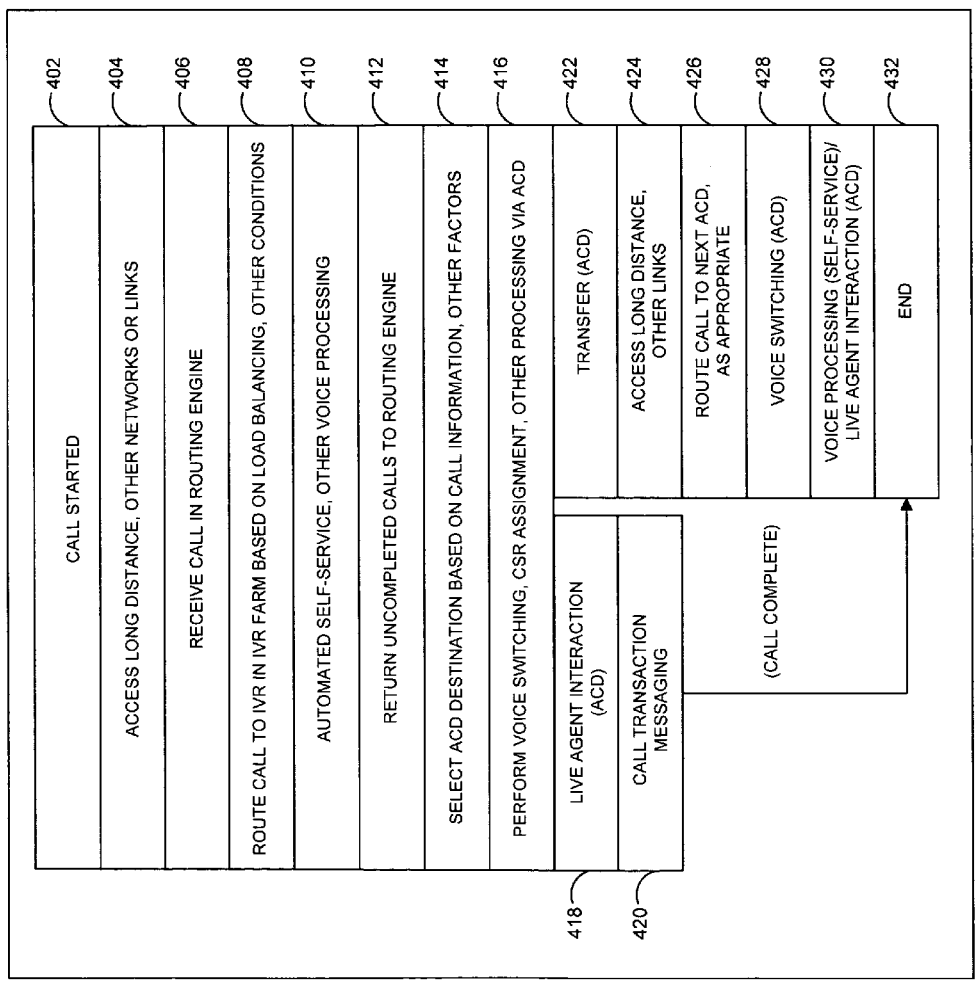
FIG. 4 illustrates overall call flow processing, according to embodiments of the invention.

FIG. 4 illustrates overall call flow processing and distribution logic, according to embodiments of the invention. In step 402, a customer service or other call may be initiated, for instance by a consumer or other caller 102 calling a wireless customer service number via a cellular connection, an (800) landline or other channel or connection. In step 404, the call may access the switched long distance network or other networks or links, such as cellular telephone over the air connections, voice over IP (VoIP) connections or other wired, wireless, optical or other channels or connections. In step 406, the call may be received in routing engine 106, which may for example consist of one or more servers, routers or other hardware or infrastructure supporting circuit switched, packet switched or other routing or connections. In step 408, the call may be automatically routed to an automated call response resource 108, such as the set of interactive voice response farms 110 or other site or resources which may directly receive and respond to inbound or other calls.

In embodiments, individual calls may be routed via routing engine 106 or otherwise to a given IVR farm or individual IVR units in the set of interactive voice response farms 110, based on load balancing, failover or other network conditions within the automated call response resource 108. In embodiments, a given IVR unit or farm in the set of interactive voice response farms 110 may have a certain number of ports or bandwidth available for new call assignment, and each farm may be maintained at 80% load or other load, bandwidth or other levels.

In embodiments of the invention in one regard, because in one respect the routing engine 106 already knows the initial destination to which the call will be directed, and also because load balancing information may be computed quickly or updated frequently, the latency or delay time in connection the call to the automated call response resource 108 may be minimal, in embodiments on the order of 250 milliseconds, or more or less. According to embodiments of the invention in another regard, because the automated call response resource 108 may in embodiments be co-located within the network of the provider providing the toll-free customer support or other service, the cost of transferring the call to the automated call response resource 108 may likewise be reduced to comparatively modest levels.

In step 410, automated call self-service, such as capture of caller entered digits or other caller data (CED) via keypad or voice recognition responses in response to voice menus or natural speech recognition engines, or other types of caller interaction or response, may be performed via the automated call response resource 108. For example, the caller may be prompted to enter a credit card or other account number, a cellular telephone number, a social security or other identification code, or other information to the automated call response resource 108. In further embodiments, the routing engine 106 may transmit part or all of call information 114 to the automated call response resource 108.

In those cases the automated call response resource 108 may respond to the call based or based in part on that information, for example, by presenting the user with a pre-loaded voice menu of access choices to an account which has been identified by a lookup against the calling number as a home telephone number, or by processing other call data. For some callers, the automated or self-service response provided via the automatic rollover to automated call response resource 108 may be sufficient to satisfy their inquiry, and the call may be terminated. The call may be terminated for example by automatic termination by the automated call response resource 108, by the caller hanging up or otherwise.

In step 412, any uncompleted calls may be returned from the automated call response resource 108 to the routing engine 106, for further discrimination and processing. In step 414, the routing engine 106 or other control logic may route the call to an ACD destination within set of automatic call distributors 112, selecting an ACD for instance based on call information 114, and in cases other data or factors, such as load balancing between the set of automatic call distributors 112, location or connection costs of those resources. In step 416, call distribution processing may be performed via an ACD or other distribution control, such as voice switching, assignment of a CSR or other representative or agent, or other call processing or conditioning.

In step 418, the call may be transferred to a CSR or other agent for live interaction, as appropriate. In step 420, call transaction messaging may be performed, for instance, by a CSR who may capture caller account or other data in a "screen pop" or other action, such as transmitting an email to the caller or other destination, or entering call information into a database. In cases the interaction with an agent or consultant may be sufficient to satisfy the caller's inquiry and the call may be likewise terminated.

In some portion or percentage of calls reaching the set of automatic call distributors 112, the processing by the initial stage of ACD and/or CSR or other agent resources may not be sufficient to satisfy the caller's inquiry or transaction. For instance, the caller may be inquiring regarding a transaction or bill from months or a year ago or more, the data for which may not be accessible to the CSR within their tool set. In those and other cases, processing may proceed to step 422 in which an ACD-to-ACD transfer may be initiated. In step 424, long distance or other lines or connections may be accessed to transfer the as-yet unsatisfied call to another ACD or other site or resource. In step 426, the call may be routed and transferred to the next ACD or other resource in the set of automatic call distributors 112 or otherwise, for example to a site connected to database resources having archival records or other data.

In step 428, voice switching via the next ACD may be performed, and in step 430 self-service voice processing or live agent interaction may be presented, as appropriate. In embodiments the call may be redirected further successive ACD sites, if the inquiry is not satisfied, as appropriate. In step 432, after ultimate satisfaction of the caller's inquiry or transaction, processing may repeat, return to a prior processing point, jump to a further processing point or end.

The foregoing description of the invention is illustrative, and modifications in configuration and implementation will occur to persons skilled in the art. For instance, while the invention has generally been described in terms of inbound customer service or other calls arriving over a single voice network, in embodiments the communications links over which calls are initially received may include multiple landline or air interfaces or networks, or voice-enabled data networks such as voice over IP (VoIP) networks, combinations of the same or others networks or connections.

For further example, while the automated call response resource 108 has been described in terms of implantations incorporating a set of interactive voice response farms 110, in embodiments other automated or programmed voice or other response units may be used. Similarly, while embodiments of the invention have been illustrated as operating under control of a single routing engine 106, in embodiments multiple local or remote routing engines or other decision logic may be implemented. Other hardware, software or other resources described as singular may in embodiments be distributed, and similarly in embodiments resources described as distributed may be combined. Again, while the invention has been illustrated generally in terms of call center networks supporting consumer level service functions, in the platform of the invention may be applied to government, corporate, academic or other support environments. The scope of the invention is accordingly intended to be limited only by the following claims.

I claim:

1. A system for routing calls in a call center, comprising:
a network interface to receive a set of calls via a network;
a routing engine, the routing engine communicating with the network interface to receive the set of calls and associated call information;
a set of automated call response resources, communicating with the routing engine to automatically receive and process the set of calls; and
a set of automatic call distribution resources, communicating with the routing engine, the routing engine automatically transferring unfinished calls within the set of calls processed in the set of automated call response resources to the set of automatic call distribution resources.

2. A system according to claim 1, wherein the network comprises a voice network.

3. A system according to claim 2, wherein the voice network comprises at least one of a landline voice network, an over the air voice network, and a packet-switched voice network.

4. A system according to claim 1, wherein the associated call information comprises at least one of called number data, calling number data, caller entered data, date data and time data.

5. A system according to claim 1, wherein the set of automated call response resources comprises a set of interactive voice response farms.

6. A system according to claim 5, wherein the interactive voice response farms present the callers on the set of calls with a voice menu.

7. A system according to claim 6, wherein the voice menu prompts the caller for input.

8. A system according to claim 7, wherein the input comprises at least one of keypad input and voice input.

9. A system according to claim 1, wherein the set of automatic call distribution resources comprises a set of automatic call distributor units.

10. A system according to claim 9, wherein the automatic call distributor units communicate with service representative workstations to transfer calls to service representatives.

11. A system according to claim 1, wherein the routing engine transfers the set of calls to selected resources in the set of automated call response resources based on load balancing conditions in the set of automated call response resources.

12. A system according to claim 1, wherein the routing engine transfers the unfinished calls to the set of automatic call distribution resources based at least upon the call information.

13. A method for routing calls in a call center, comprising:
receiving a set of calls via a network, each of the set of calls having associated call information;
automatically transferring the set of calls to a set of automated call response resources; and
automatically transferring unfinished calls within the set of calls processed in the set of automated call response resources to automatic call distribution resources.

14. A method according to claim 13, wherein the network comprises a voice network.

15. A method according to claim 14, wherein the voice network comprises at least one of a landline voice network, an over the air voice network, and a packet-switched voice network.

16. A method according to claim 13, wherein the associated call information comprises at least one of called number data, calling number data, caller entered data, date data and time data.

17. A method according to claim 13, wherein the set of automated call response resources comprises a set of interactive voice response farms.

18. A method according to claim 17, wherein the interactive voice response farms present the callers on the set of calls with a voice menu.

19. A method according to claim 18, wherein the voice menu prompts the caller for input.

20. A method according to claim 19, wherein the input comprises at least one of keypad input and voice input.

21. A method according to claim 13, wherein the set of automatic call distribution resources comprises a set of automatic call distributor units.

22. A method according to claim 21, wherein the automatic call distributor units communicate with service representative workstations to transfer calls to service representatives.

23. A method according to claim 13, wherein the step of automatically transferring the set of calls to a set of automated call response resources comprises transferring the set of calls to selected resources in the set of automated call response resources based on load balancing conditions in the set of automated call response resources.

24. A method according to claim 13, wherein the further comprising transferring the unfinished calls to the set of automatic call distribution resources based at least upon the call information.

25. A routing engine, the routing engine being configured to execute a method for routing calls in a call center, the method comprising:
receiving a set of calls via a network, each of the set of calls having associated call information;
automatically transferring the set of calls to a set of automated call response resources via the routing engine with associated call information; and
automatically transferring unfinished calls within the set of calls processed in the set of automated call response resources to a set of automatic call distribution resources.

26. A routing engine according to claim 25, wherein the network comprises a voice network.

27. A routing engine according to claim 26, wherein the voice network comprises at least one of a landline voice network, an over the air voice network, and a packet-switched voice network.

28. A routing engine according to claim 25, wherein the associated call information comprises at least one of called number data, calling number data, caller entered data, date data and time data.

29. A routing engine according to claim 25, wherein the set of automated call response resources comprises a set of interactive voice response farms.

30. A routing engine according to claim 29, wherein the interactive voice response farms present the callers on the set of calls with a voice menu.

31. A routing engine according to claim 25, wherein the set of automatic call distribution resources comprises a set of automatic call distributor units.

32. A routing engine according to claim 31, wherein the automatic call distributor units communicate with service representative workstations to transfer calls to service representatives.

33. A routing engine according to claim 25, wherein routing engine performs the step of automatically transferring the set of calls to a set of automated call response resources based on load balancing conditions in the set of automated call response resources.

34. A routing engine according to claim 25, wherein the routing engine transfers the unfinished calls to the set of automatic call distribution resources based at least upon the call information.

* * * * *